United States Patent
Yata

(10) Patent No.: US 7,804,751 B2
(45) Date of Patent: Sep. 28, 2010

(54) METHOD OF DISTINGUISHING OPTICAL RECORDING MEDIUM AND APPARATUS OF THE SAME

(75) Inventor: Hisayoshi Yata, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 447 days.

(21) Appl. No.: 11/724,423

(22) Filed: Mar. 14, 2007

(65) Prior Publication Data

US 2007/0217307 A1    Sep. 20, 2007

(30) Foreign Application Priority Data

Mar. 15, 2006    (JP) .............................. 2006-110237

(51) Int. Cl.
G11B 15/04    (2006.01)

(52) U.S. Cl. ................. 369/53.22; 369/53.37

(58) Field of Classification Search ............... None
See application file for complete search history.

(56) References Cited

U.S. PATENT DOCUMENTS

| | | | | |
|---|---|---|---|---|
| 5,880,388 A | * | 3/1999 | Kajiyama et al. | 84/609 |
| 6,535,469 B1 | * | 3/2003 | Heylen | 369/53.21 |
| 7,039,188 B2 | * | 5/2006 | Saliahov | 380/229 |
| 7,057,993 B2 | * | 6/2006 | Barnard et al. | 369/53.21 |
| 2002/0031065 A1 | * | 3/2002 | Kajiyama et al. | 369/47.23 |
| 2003/0210631 A1 | * | 11/2003 | Tung et al. | 369/53.24 |
| 2004/0145986 A1 | * | 7/2004 | Taylor | 369/53.1 |
| 2005/0237866 A1 | * | 10/2005 | Sako et al. | 369/30.3 |
| 2006/0114763 A1 | * | 6/2006 | Nakamae et al. | 369/30.28 |
| 2006/0156386 A1 | * | 7/2006 | Jung et al. | 726/2 |
| 2006/0173786 A1 | * | 8/2006 | Chen et al. | 705/58 |
| 2008/0225663 A1 | * | 9/2008 | Smith et al. | 369/53.17 |
| 2009/0219796 A1 | * | 9/2009 | Kahlman | 369/47.19 |

FOREIGN PATENT DOCUMENTS

| | | |
|---|---|---|
| JP | 08-007369 A | 1/1996 |
| JP | 2002-288827 | 10/2002 |
| JP | 2005-228418 | 8/2005 |
| WO | WO 99/35641 | 7/1999 |

\* cited by examiner

Primary Examiner—Paul Huber
(74) Attorney, Agent, or Firm—Law Office of Katsuhiro Arai

(57) ABSTRACT

One inventive aspect relates to a method which easily distinguishes copycat products that are difficult to distinguish by identifying only a media ID. A media ID and other attribute data are read out of a reference optical recording medium, and then a media ID and other attribute data are read out of an optical recording medium that is a target for separation. They are compared with each other in a data record processing section to determine whether data is data matched or not matched, and the result is displayed on a display section.

11 Claims, 2 Drawing Sheets

METHOD OF DISTINGUISHING OPTICAL RECORDING MEDIUM AND APPARATUS OF THE SAME

BACKGROUND OF THE INVENTION

1. Field of the Invention

The present invention relates to a method of distinguishing copycat products from a genuine product in optical recording media such as CD-R and DVD±R and a distinguishing apparatus used for the same.

2. Description of the Related Technology

An optical recording medium such as CD-R and DVD±R is configured in which a dye layer, a reflective layer, and a protective layer are in turn formed on a transparent substrate such as a polycarbonate (DVD±R is formed of a polycarbonate substrate further thereon). Data is recorded on the dye layer. Since the characteristics of the dye layer are varied among manufacturers and the recording conditions are different, it is necessary to math with the optimum recording conditions in data recording.

In a recording apparatus nowadays, a media ID (manufacturer ID) recorded on an optical recording medium in advance is read, and the recording conditions corresponding to the read media ID are looked up from a library for data recording. The media ID is decided for every manufacturer, whereby data is recorded in accordance with the optimum recording conditions set by a manufacturer. See JP-A-2005-228418 and JP-A-2002-288827.

SUMMARY OF CERTAIN INVENTIVE ASPECTS

In recent years, optical recording media having imitated media IDs are on the market. These copycat products have a dye layer different from the dye layer of manufacturer's authorized products, and have different optimum recording conditions. Thus, when data is recorded under the recording conditions corresponding to a media ID identified by a recording apparatus, a problem arises that the characteristics after recorded are not excellent and recorded data is not read out in the worst case. However, in accordance with media IDs under the current circumstances, since a recording apparatus recognizes copycat products as authorized products, it is difficult to distinguish authorized products from copycat products.

In order to solve such a problem, certain inventive aspects provide a method of distinguishing an optical recording medium which can easily distinguish copycat products, and an apparatus used for the same.

Certain inventive aspects provide a method of distinguishing an optical recording medium including: a first step of reading a media ID and other attribute data out of a reference optical recording medium; a second step of reading a media ID and other attribute data out of an optical recording medium that is a target for separation; a third step of comparing the media ID and other attribute data of the reference optical recording medium with the media ID and other attribute data of the optical recording medium that is a target for separation; and a fourth step of displaying a compared result.

Moreover, a method of distinguishing an optical recording medium is to be provided in which the first step or the second step includes the steps of: storing a media ID and other attribute data read out of an optical recording medium in a memory; and calling a media ID and other attribute data from the memory.

Furthermore, certain inventive aspects provide an apparatus of distinguishing an optical recording medium including: a first read means operable to read a media ID and other attribute data out of a reference optical recording medium; a second read means operable to read a media ID and other attribute data out of an optical recording medium that is a target for separation; a comparing means operable to compare the media ID and other attribute data read out of the first read means with the media ID and other attribute data readout of the second read means; and a display means operable to display a compared result done by the comparing means.

Moreover, an apparatus of distinguishing an optical recording medium is provided in which the first read means and the second read means are shared.

According to certain inventive aspects, for authorized products as well as copycat products, a media ID and other attribute data are read out of an actual optical recording medium for comparison. Therefore, copycat products can be easily distinguished.

BRIEF DESCRIPTION OF THE DRAWINGS

The teachings of certain inventive aspects can be readily understood by considering the following detailed description in conjunction with the accompanying drawings, in which.

DETAILED DESCRIPTION OF CERTAIN ILLUSTRATIVE EMBODIMENTS

Figure 1:
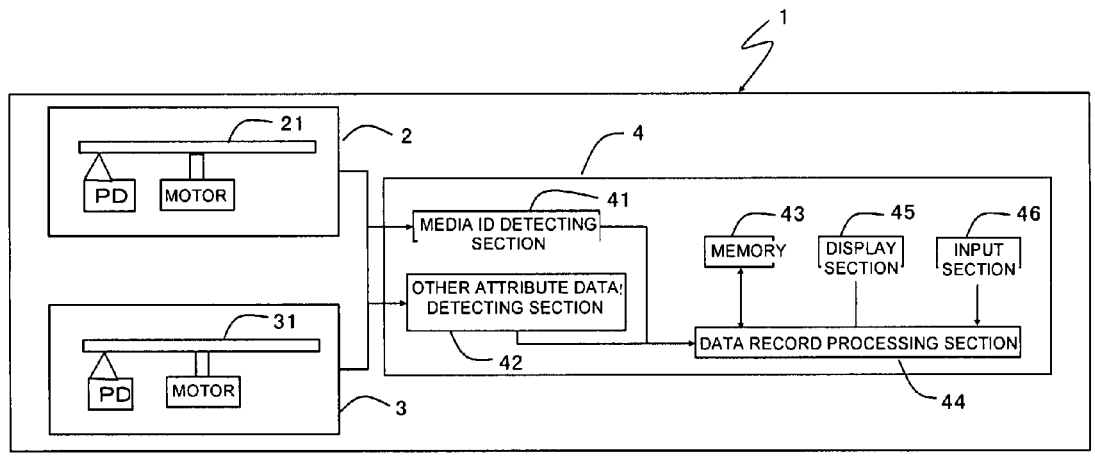
FIG. 1 shows a functional block diagram depicting an embodiment of the invention.

Various aspects and features of the invention will become more fully apparent from the following description and appended claims taken in conjunction with the foregoing drawings. In the drawings, like reference numerals indicate identical or functionally similar elements. In the following description, specific details are given to provide a thorough understanding of the disclosed methods and apparatus. However, it will be understood by one of ordinary skill in the technology that the disclosed systems and methods may be practiced without these specific details.

FIG. 1 shows a functional block diagram depicting a distinguishing apparatus of an optical recording medium according to an embodiment of the invention. A distinguishing apparatus 1 according to the embodiment includes a first recording and reproduction unit 2 which corresponds to a first read means, a second recording and reproduction unit 3 which corresponds to a second read means, and a personal computer section 4. In addition, in FIG. 1, the personal computer section 4 is combined together with the first recording and reproduction unit 2 or the second recording and reproduction unit 3, but they may be configured separately. Moreover, the first recording and reproduction unit 2 and the second recording and reproduction unit 3 may share the same recording and reproduction unit. Furthermore, the personal computer section 4 includes a data record processing section 44 having a comparing means as well as includes a memory 43 such as a hard disk and a flash memory, a display section 45 such as a display and a printer, and an input section 46 such as a keyboard and a mouse.

A reference optical disk 21 is set on the first recording and reproduction unit 2, and an optical disk 31 that is a target for separation is set on the second recording and reproduction unit 3. For the optical disk used here, optical disks such as CD-R and DVD±R are named. The structure of the optical disk is configured in which a dye layer, a reflective layer, and a protective layer to be recording layers are in turn formed on a transparent substrate such as a polycarbonate. The transparent substrate has a groove portion called a groove, and a projecting portion between the grooves called a land thereon, in which data is recorded on the groove portion. In the DVD-R, a recess called an LPP (Land pre-pit) is formed in the land portion, and in the DVD±R, a zigzag portion called ADIP (Address in pregroove) is formed in the groove portion.

The format of the optical disk has a recording area called a lead-in area and a lead-out area in addition to a normal data recording area. In these areas, information relating to the media ID and other attribute data is recorded in the lead-in area. Here, the other attribute data includes recording conditions such as laser output and pulse conditions, and disk information about a disk format. In the DVD±R, information relating to the media ID and other attribute data is recorded in LPP or ADIP as well.

Next, the operation of the distinguishing apparatus 1 according to one embodiment will be described. A reference optical disk 21 is set on the first recording and reproduction unit 2 to read signals recorded in the lead-in area, LPP or ADIP in advance. Subsequently, the signals read out of the first recording and reproduction unit 2 are sent to a media ID detecting section 41 and an other attribute data detecting section 42, converted into a media ID and other attribute data, and sent to the data record processing section 44. The data sent to the data record processing section 44 is temporarily stored in the memory 43, or displayed on the display section 45.

Then, an optical disk 31 that is a target for separation is set on the second recording and reproduction unit 3 to read signals recorded on optical disk in advance with LPP or ADIP. Subsequently, the signals read out of the second recording and reproduction unit 3 are sent to the media ID detecting section 41 and the other attribute data detecting section 42, converted into a media ID and other attribute data, and sent to the data record processing section 44. The data sent to the data record processing section 44 is temporarily stored in the memory 43, or displayed on the display section 45.

Moreover, product information such as a brand name, a product name, a manufacturer, a lot number and so on can be properly inputted by manual input with the input section 46.

Figure 2:
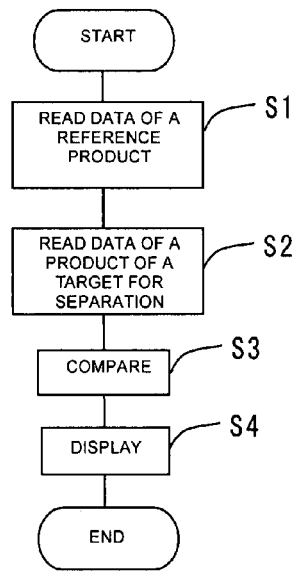
FIG. 2 shows a flow chart depicting an exemplary a method according to one embodiment.

Here, the procedures of data processing performed in the data record processing section 44 will be described with reference to FIGS. 2 and 3. FIG. 2 shows a flow chart depicting exemplary procedures executed in the data record processing section 44. First, the media ID and other attribute data of the reference optical disk are read out of the first read means (S1). The other attribute data may be partially read, but preferably, all the data is read for accurate comparison. Here, the descriptions of the read data may be displayed on the display section 45. Moreover, product information may be manually inputted with the input section 46 to read data out of the optical disk.

Subsequently, the media ID and other attribute data of the optical disk that is a target for separation are read out of the second read means (S2). Here, the descriptions of the read data may be displayed on the display section 45. Moreover, product information may be manually inputted with the input section 46 to read data out of the optical disk.

Then, data of the reference product is compared with data of the product that is a target for separation (S3). First, it is determined whether the media ID is matched or not. Subsequently, the other attribute data is compared. The other attribute data is compared item by item, and then it is determined whether the items are matched or not.

Subsequently, the compared results are displayed on the display section 45 (S4). When an authorized product is the reference product and a copycat product is the product that is a target for separation for determination, the results shown in table 1 are obtained.

TABLE 1

|  | Media ID | Other attribute data |
|---|---|---|
| Disk A of target for separation | Matched | Not matched |
| Disk B of a target for separation | Matched | Matched |

For copycat products as the disk A of a target for separation, it can be distinguished by a method of comparing data with the recording conditions stored in a library of a recording apparatus because the other attribute data is different. On the other hand, for copycat products that imitate even other attribute data as the disk B of a target for separation, they cannot be distinguished according to methods before. However, according to one embodiment, since the actual disk is compared, copycat products as the disk B of a target for separation can be distinguished.

Figure 3:
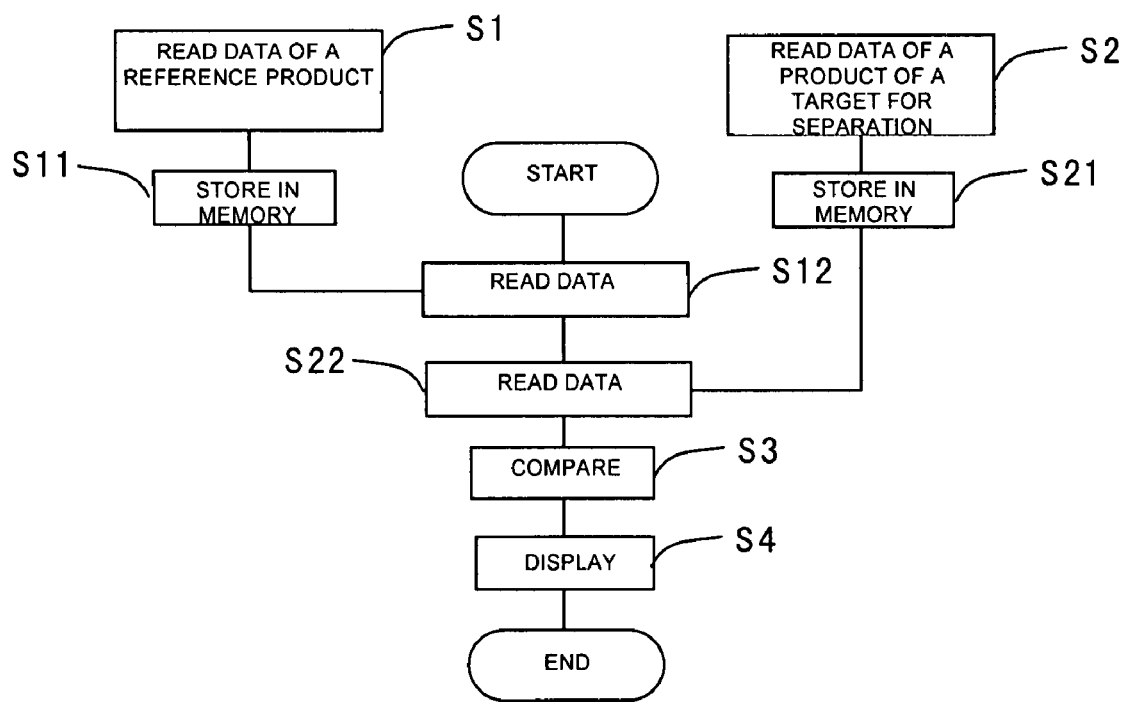
FIG. 3 shows a flow chart depicting another exemplary method according to one embodiment.

Next, FIG. 3 shows a flow chart depicting other exemplary procedures executed in the data record processing section 44. The procedures are different from those shown in the flow chart in FIG. 2 in that after the data of the reference product is read (S1), the read data is temporarily stored in the memory (S11), and data is read out of the memory as necessary (S12) and that after the data of the product that is a target for separation is read (S2), the read data is temporarily stored in the memory (S21), and data is read out of the memory as necessary (S22). In addition, in the flow chart shown in FIG. 3, the data of both of the reference product and the product that is a target for separation is read out of the memory, but data may be directly read out of any one of actual optical disks.

Moreover, the first read means and the second read means may be separated, or a single read means may shared. In this case, these schemes may be done in which after the data of the reference product is read and the disk is replaced by the product that is a target for separation for data read, or in which data of one of the disks is read out of data stored in the memory in advance and the other data is read out of the read means.

In addition, generally, authorized products are the reference product and copycat products are the product that is a target for separation for determination, but such a scheme may be done in which copycat products are the reference product and authorized products are the product that is a target for separation for determination.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A method of distinguishing a target optical recording medium and a reference optical recording medium having dye layers for recording, comprising:

reading a media ID and other attribute data including conditions for recording recorded in a lead-in-area, Land pre-pit (LPP), or Address in pre-groove (ADIP) of the reference optical recording medium, said conditions for recording including laser output for recording and pulse conditions for recording;

reading a media ID and other attribute data including conditions for recording recorded in a lead-in area, LPP, or ADIP of the target optical recording medium, said conditions for recording including laser output for recording and pulse conditions for recording;

comparing the media ID and each item of the other attribute data of the reference optical recording medium item by item with the media ID and each item of the other attribute data of the target optical recording medium;

displaying results of the comparison on a monitor; and if the media ID of the reference optical recording medium matches that of the target optical recording medium, but any item of the other attribute data of the reference optical recording medium does not match the corresponding item of the other attribute data of the target optical recording medium, judging that the dye layers of the target optical recording medium and the reference optical recording medium are different, thereby distinguishing the target optical recording medium and the reference optical recording medium.

2. The method of distinguishing an optical recording medium according to claim 1, wherein the reading of the media ID and other attribute data recorded in the record-in area, LLP, or ADIP of the reference optical recording medium comprises:

storing the media ID and other attribute data read recorded in the lead-in area, LLP, or ADIP of the reference optical recording medium in a memory; and calling the media ID and other attribute data from the memory.

3. The method of distinguishing an optical recording medium according to claim 1, wherein the reading of the media ID and other attribute data recorded in the lead-in area, LLP, or ADIP of the target optical recording medium under test comprises:

storing the media ID and other attribute data read recorded in the lead-in area, LLP, or ADIP of the optical recording medium in a memory; and calling the media ID and other attribute data from the memory.

4. The method according to claim 1, further comprising determining whether the target optical recording medium is identical to the reference optical recording medium based on the comparison.

5. The method according to claim 1, further comprising displaying the result of the comparison.

6. The method according to claim 1, wherein the reference optical recording medium is a genuine product, and the target optical recording medium is a suspected copycat product.

7. An apparatus for distinguishing a first optical recording medium and a second optical recording medium having dye layers for recording, the apparatus comprising:

a first recording and reproduction unit configured to read a media ID and other attribute data including conditions for recording recorded in a lead-in area, Land pre-pit (LPP), or Address in pre-groove (ADIP) of the first optical recording medium, said conditions for recording including laser output for recording and pulse conditions for recording;

a second recording and reproduction unit configured to read a media ID and other attribute data including conditions for recording recorded in a lead-in area, LPP, or ADIP of the second optical recording medium, said conditions for recording including laser output for recording and pulse conditions for recording;

a processing unit configured to compare the media ID and each item of the other attribute data read recorded in the lead-in area, LPP, or ADIP of the first optical recording medium item by item with the media ID and each item of the other attribute data read recorded in the lead-in area, LPP, or ADIP of the second optical recording medium, wherein if the media ID of the reference optical recording medium matches that of the target optical recording medium, but any item of the other attribute data of the reference optical recording medium does not match the corresponding item of the other attribute data of the target optical recording medium, it is judged that the dye layers of the target optical recording medium and the reference optical recording medium are different, thereby distinguishing the target optical recording medium and the reference optical recording medium; and a monitor for displaying results of the comparison by the processing unit.

8. The apparatus of claim 7, wherein a single recording and reproduction unit is used as the first and the second recording and reproduction unit.

9. The apparatus of claim 7, further comprising a display unit configured to display the result of comparison.

10. The apparatus of claim 7, further comprising a memory unit configured to store the media ID and other attribute data read from the lead-in area, LLP, or ADIP of the first and/or second optical recording medium.

11. An apparatus for distinguishing a target optical recording medium and a reference optical recording medium having dye layers for recording, the apparatus comprising:

means for reading a media ID and other attribute data including conditions for recording recorded in a lead-in area, Land pre-pit (LPP), or Address in pre-groove (ADIP) of the reference optical recording medium, said conditions for recording including laser output for recording and pulse conditions for recording;

means for reading a media ID and other attribute data including conditions for recording recorded in a lead-in area, LPP, or ADIP of the target optical recording medium, said conditions for recording including laser output for recording and pulse conditions for recording;

means for comparing the media ID and each item of the other attribute data of the reference optical recording medium item by item with the media ID and each item of the other attribute data of the target optical recording medium, wherein if the media ID of the reference optical recording medium matches that of the target optical recording medium, but any item of the other attribute data of the reference optical recording medium does not match the corresponding item of the other attribute data of the target optical recording medium, it is judged that the dye layers of the target optical recording medium and the reference optical recording medium are different, thereby distinguishing the target optical recording medium and the reference optical recording medium; and means for displaying results of the comparison.

* * * * *

UNITED STATES PATENT AND TRADEMARK OFFICE
CERTIFICATE OF CORRECTION

| | | |
|---|---|---|
| PATENT NO. | : 7,804,751 B2 | Page 1 of 1 |
| APPLICATION NO. | : 11/724423 | |
| DATED | : September 28, 2010 | |
| INVENTOR(S) | : Hisayoshi Yata | |

It is certified that error appears in the above-identified patent and that said Letters Patent is hereby corrected as shown below:

Claim 2 in line 38 of column 5, please correct the word "record-in" to --lead-in--

Signed and Sealed this
Twenty-eighth Day of December, 2010

David J. Kappos
*Director of the United States Patent and Trademark Office*